Patented Nov. 10, 1953

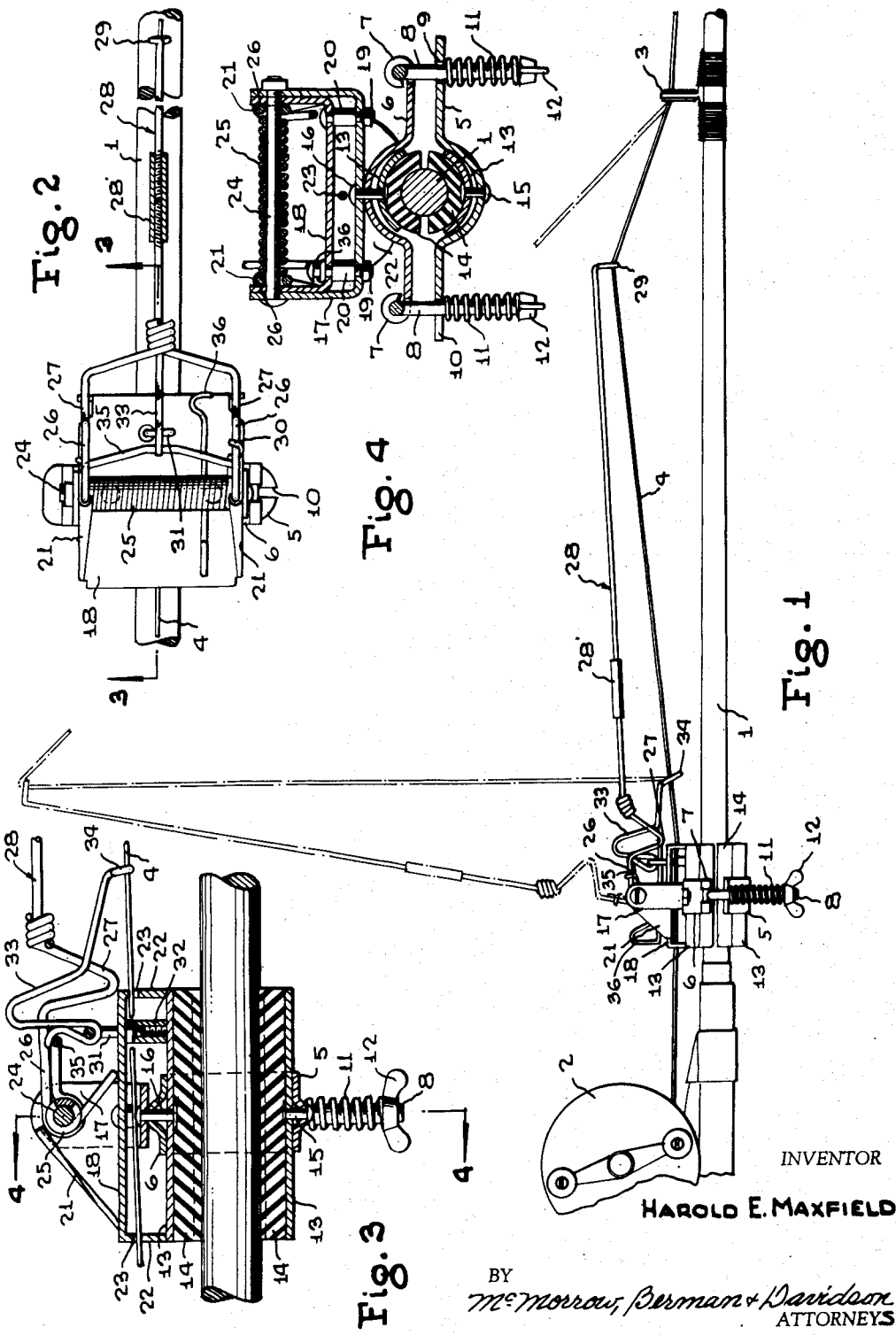

2,658,299

UNITED STATES PATENT OFFICE 2,658,299

HOOK-SETTING DEVICE

Harold E. Maxfield, Laramie, Wyo.

Application July 24, 1951, Serial No. 238,207

3 Claims. (Cl. 43—15)

This invention relates to fishing tackle, and more particularly has reference to a device attachable to a fishing rod and adapted for hooking a fish and setting the hook in the fish's mouth.

By way of background, it may be noted that devices of the general character described are not new. However, those devices that have previously been devised for the stated purpose have not, to my knowledge, proved entirely satisfactory. It is important that in a device of the type stated the device be capable of ready attachment to or detachment from a fishing rod, so that, at the option of the fisherman, the device may be used or not used as desired.

It is also of importance in such a device that the device be so formed and mounted on the rod as not to interfere with ordinary casting of the lure or bait. Continuing, it is important also that the device interfere in no respect with the reeling in of the line, or playing of the fish after the fish has been hooked.

Still further, a device as stated should be so formed as to be capable of being triggered at the proper time after the fish has taken the bait or lure and has pulled gently upon the line, and after triggering or releasing of the device, the device should desirably act instantly to set the hook firmly in the fish's mouth.

It is the broad purpose of the present invention to provide a device which will have all the advantages stated.

More specifically, it is proposed to provide a device as described that will be capable of attachment with facility to a fishing rod of any size or diameter.

Another important object is to provide a device of the type stated in which the jerker arm thereof can be interchanged for arms of shorter or longer length, as may be desired by the fisherman.

Yet another object is to provide a fish-hooking device which will operate instantly and efficiently on all occasions when the bait has been taken by the fish and a gentle pull exerted upon the line by the fish.

Yet another object is to provide a hook-setting device as described an adjustable trigger capable of being tensioned adjustably, so as to be responsive to more or less pull upon the line by the fish, this being desirable in view of the fact that in some instances the bait will be at a substantial depth, while in other instances a heavier line might be used or a heavier weight or sinker. All of these factors tend to affect to extent of pull upon the line by the fish.

Yet another object is to provide in a hook-setting device as described an adjustable trigger capable of being tensioned adjustably, so as to be responsive to more or less pull upon the line by the fish, this being desirable in view of the fact that in some instances the bait will be at a substantial depth, while in other instances a heavier line might be used or a heavier weight or sinker. All of these factors tend to affect to extent of pull upon the line by the fish.

Still another object is to provide a device as described which, when being removed from a fishing rod, need not be disassembled either in whole or in part.

Another object is to provide a fish-hooking device which, after it effects the setting of the hook in the fish's mouth, will move upwardly and downwardly according to the pressure exerted upon the line by the fish, and will, at the same time, allow the fish to pull more line from the reel, whereby the fish is "played" until the angler takes the rod.

Referring to the drawings:

Figure 1 is a side elevational view of a fish-hooking device formed in accordance with the present invention, the dotted lines indicating a position to which the hook-setting arm is swingable after the triggering of the device by the fish, said device being illustrated as mounted upon a fishing rod, portions of which are broken away;

Figure 2 is an enlarged top plan view, portions of the rod and hook-setting arm being broken away;

Figure 3 is a longitudinal sectional view, portions being broken away;

Figure 4 is a transverse sectional view taken on line 4—4 of Figure 3.

Referring to the drawings in detail, a conventional fishing rod 1 is provided with a reel 2 and a plurality of line guides 3, a fishing line 4 extending from said reel through the several guides.

The present invention includes a clamp means, whereby the device is attached to the rod shortly in advance of the reel 2, and this clamping device comprises lower and upper clamp members 5 and 6 that respectively underlie and overlie the rod, as best seen from Figure 4. The clamp members are provided with opposed arcuate medial portions in which the rod 1 is seated.

The upper clamp member 6 is formed at opposite ends with rolled sleeves 7 in which are pivotally mounted the upper ends of T-shaped clamping bolts 8. The lower clamp member 5 is provided at one end with an opening 9 loosely receiving one of the bolts 8, while the other end of the lower clamp member has a short longitudinal slot opening inwardly from said other end, that receives the shank of the other bolt 8, said slot being designated 10.

As seen from Figure 4, the shanks of the bolts 8 project downwardly a substantial distance below the lower clamp member, and extend through coil springs 11 held under compression by wing nuts 12 which are capable of being threaded upwardly and downwardly upon the bolts, for the purpose of adjusting the tension of said springs.

Carried by the respective clamp members are transversely curved clamping plates 13 extending longitudinally of the rod 1, there being interposed between said clamping plates and the rod resilient, transversely curved cushions or pads 14. Rivets 15 and 16 connect the respective clamping plates to the clamp members 5 and 6.

The rivet 16 secures to the upper clamp member 6 a U-shaped yoke 17 disposed transversely of and overlying the rod 1, and the yoke 17 in turn supports the flat body 18 of a supporting member, said body being secured rigidly to the yoke 17 by means of bolts 19 extending therebetween. The body 18 is spaced above the base of the yoke by means of spacer sleeves 20 through which the bolts 19 extend.

Formed integrally upon the supporting member at opposite sides of the body 18 thereof are upturned ears 21 contiguous to the upstanding arms of the yoke, said supporting member being also integrally formed with downturned ends 22 recessed to fit over the end portions of the upper clamping plate 13.

In the downturned ends 22 horizontally aligned apertures 23 are formed, the fishing line 4 passing loosely through said apertures.

A connecting bolt 24 is disposed transversely of the fishing rod and connects the upstanding arms of the yoke and ears of the supporting member, and provides a support for a coil spring 25 through which the connecting bolt extends.

Pivotally mounted upon the opposite ends of the connecting bolt are the forwardly converging arms 26 having downwardly offset portions 27. The arms 26 constitute the inner end of an elongated rod member, generally designated 28, extended longitudinally of the fishing rod 1 and formed at its free end with an eye 29 through which is passed the fishing line 4. The rod member 28 is of sectional formation, the inner and outer sections thereof being separably but fixedly connected by an internally threaded connecting sleeve 28'. Outer sections of selected, different lengths may thus be conveniently interchanged to provide a rod member 28 of a desired length. After passage through the eye 29, the fishing line is passed through that line guide 3 that is disposed nearest the reel 2, as shown in Figure 1.

Normally, rod member 28 is held in the full line position illustrated in Figure 1 by the trigger means to be described. However, when the trigger is released, the rod member is swung upwardly in a vertical plane to the chain-dotted position illustrated in Figure 1 under the action of the coil spring 25. Coil spring 25 in this connection has one end hooked over one of the forwardly converging arms 26, as shown at 30. The other end of the spring, as seen from Figure 3, is engaged against body 18 of the supporting member. When rod member 28 is in the full line position illustrated in Figure 1, coil spring 25 is held under substantial tension, and it will thus be apparent that when the trigger is released, the spring 25, under moment tending to unwind it, jerks rod member 28 instantaneously to an upstanding position, thus to pull inwardly a substantial length of fishing line 4.

Considering now the trigger means embodied in the invention, a trigger support screw 31 is of inverted U shape, and is vertically slidable within the body 18 of the supporting member, said screw being threaded at one end for engagement within a tension-adjusting sleeve nut 32. Thus, rotation of sleeve nut 32 in one direction will adjust screw 31 upwardly, while rotation in an opposite direction will adjust screw 31 downwardly.

Pivotally mounted upon the upper end of screw 31 is the intermediate portion of a trigger 33 having at its front end an eye 34 receiving the line 4, the line 4 passing loosely through said eye. At its other end the trigger is hooked over a cross member 35 rigidly secured to and extending transversely between the converging arms 26.

When it is desired to retain, temporarily, the rod member 28 in the full line position illustrated in Figure 1, in a manner whereby it will not be subject to release by the trigger, a horizontally swingable catch 36 is hooked over the downwardly offset portion 27 of one of the arms 26, the catch 36 being pivotally connected to one of the bolts 19 by means of one end being wrapped about the portion of such bolt above the complemental sleeve 20, as clearly shown in Figures 2 and 4.

The use of the device may now be readily noted. Assuming that it is desired to cast the lure, the rod member 28 is first manually forced to the full line position illustrated in Figure 1, and the catch 36 is engaged over the downwardly offset portion 27. Thereafter, the casting operation may be carried out with facility, and it will be noted, and is an important feature of the device, that the casting is not interfered with by the device, the line 4 running loosely through the openings 23 during said casting.

After the lure has been cast out, the trigger 33 is set in the position illustrated in Figure 3, and the catch is adjusted to the released position thereof illustrated in Figure 2.

When a fish takes the bait or lure, the fish will exert a gentle pull upon the line 4, tending to pull downwardly upon the eye of the trigger 33. As a result, the trigger will be disengaged from the cross member 35, and the spring 25, under moment tending to unwind it, instantaneously jerks the rod member 28 to the upstanding position illustrated in chain-dotted lines in Figure 1. As a result, the fish is instantaneously hooked and the hook is firmly set in the fish's mouth.

Assuming that the angler does not take charge of the rod immediately, the fish, in its efforts to disengage itself from the hook, will exert successive pulls upon the line 4, but the rod member 28, in opposition to said pulls, will continuously exert a yielding pressure in an opposite direction under the action of the spring 25. However, said action of the spring does not hold the rod member 28 in a rigid, immovable position, and the fish is "played" until the angler takes the rod.

In attaching the device to a rod or removing the device from a rod, it is necessary merely to thread downwardly that wing nut 12, illustrated at the left in Figure 4, to some extent, after which the left-hand bolt 8 is swung outwardly out of the slot 10, permitting the lower clamp member 5 to pivot upon the right-hand sleeve 7 for complete detachment of the device from the rod. At no time, of course, is it necessary to remove entirely the wing nuts 12.

It is also an important characteristic of the invention that the outer section of the rod member 28 is capable of being detached from the device without separation of any other parts of the device, and can even be detached from the device while the device is positioned upon a fishing rod 1. This is accomplished merely by removal of the outer section from the connecting sleeve 28', after which a section of longer or shorter length can be substituted.

What is claimed is:

1. A device of the class described comprising, in combination with a fishing rod having a reel and a line wound upon the reel and extending to the tip of the rod, a clamp member adapted for attachment to said rod between the reel and tip; a supporting means overlying the clamp member; means rigidly connecting the clamp and supporting means, the supporting means having apertures for passage of said fishing line loosely therethrough; a rod member pivotally mounted at one end upon the supporting means, said rod member having its other end disposed between the supporting means and rod tip and having an eye at said other end for passage of the fishing line therethrough; a trigger, means pivotally mounting the trigger upon the supporting means, said trigger having means at one end through which said line is loosely extended, the other end of the trigger being releasably engageable with the rod member; and a spring mounted upon the supporting member and engaged with the rod member for swinging the rod member upwardly responsive to pull exerted upon the line by a fish tending to release the trigger.

2. A device of the class described comprising, in combination with a fishing rod having a reel and a line wound upon the reel and extending to the tip of the rod, a clamp adapted for releasable connection to said rod between the reel and tip; a supporting means rigid with and overlying the clamp, said supporting means having at least one aperture through which said line is loosely extended; upstanding ears extended upwardly from opposite sides of said supporting means; a connecting bolt extending between said ears; a rod member pivotally mounted at one end upon said connecting bolt for swinging movement in a vertical plane, said rod member having its other end disposed between the supporting means and rod tip and being adapted at said other end for passage of the fishing line loosely therethrough; a trigger, means pivotally mounting the trigger upon the supporting means, said trigger having an eye at one end for passage of said fishing line loosely therethrough, the other end of said trigger being releasably engageable with the rod member; and a spring coiled upon said bolt and engaged with the rod member, said spring being adapted to swing the rod member upwardly on release of the rod member by the trigger responsive to pull exerted upon the trigger by the line.

3. A device of the class described comprising, in combination with a fishing rod having a reel and a line wound upon the reel and extending to the tip of the rod, a clamp adapted for releasable attachment to said fishing rod between the reel and tip; a supporting means rigid with and overlying the clamp; a rod member pivotally connected at one end to the supporting means for swinging movement in a vertical plane, said rod member having its other end disposed between the supporting means and rod tip; means on the supporting means and engaged with the rod member tending to swing the rod member upwardly; a trigger, means pivotally mounting the trigger upon the supporting means, said trigger having an eye at one end for passage loosely therethrough of the fishing line, the rod member having an eye at said other end thereof for passage loosely therethrough of the fishing line, said trigger being releasably engaged at its other end with said rod member; and means on said supporting means for up-and-down adjustment of the pivotal mounting of said trigger relative to the supporting means.

HAROLD E. MAXFIELD.

References Cited in the file of this patent

UNITED STATES PATENTS

| Number | Name | Date |
|--------|------|------|
| 77,893 | Koehler | May 12, 1868 |
| 154,141 | Hill | Aug. 18, 1874 |
| 562,195 | Plath | June 16, 1896 |
| 2,340,588 | Groves | Feb. 1, 1944 |

FOREIGN PATENTS

| Number | Country | Date |
|--------|---------|------|
| 287,367 | Great Britain | Mar. 22, 1928 |
| 62,781 | Germany | June 10, 1892 |

OTHER REFERENCES

Popular Mechanics magazine, article entitled, "Metal Arm Jerks Line When Fish Strikes," vol. 94, issues number 1, page 109, published July, 1950.